(12) United States Patent
Shechtman

(10) Patent No.: US 11,322,135 B2
(45) Date of Patent: May 3, 2022

(54) GENERATING ACOUSTIC SEQUENCES VIA NEURAL NETWORKS USING COMBINED PROSODY INFO

(71) Applicant: International Business Machines Corporation, Armonk, NY (US)

(72) Inventor: Vyacheslav Shechtman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 16/568,289

(22) Filed: Sep. 12, 2019

(65) Prior Publication Data
US 2021/0082408 A1   Mar. 18, 2021

(51) Int. Cl.
| G10L 15/00 | (2013.01) |
| G10L 15/18 | (2013.01) |
| G06N 3/04  | (2006.01) |
| G10L 15/16 | (2006.01) |

(52) U.S. Cl.
CPC ........ *G10L 15/1807* (2013.01); *G06N 3/0454* (2013.01); *G10L 15/16* (2013.01)

(58) Field of Classification Search
CPC ......... G10L 13/10; G10L 13/08; G10L 25/30; G10L 13/04; G10L 13/047; G10L 15/063; G10L 15/1807; G10L 13/033; G10L 13/02; G10L 13/027; G10L 13/00; G10L 15/16; G10L 15/26; G10L 2015/025; G10L 17/18; H04M 2201/39; G06N 3/0454
See application file for complete search history.

(56) References Cited

U.S. PATENT DOCUMENTS

| 10,559,299 B1* | 2/2020 | Arel ..................... G10L 15/02 |
| 2014/0358546 A1* | 12/2014 | Fernandez ........... G10L 15/063 704/259 |
| 2015/0186359 A1* | 7/2015 | Fructuoso ............ G10L 13/08 704/8 |
| 2016/0078859 A1 | 3/2016 | Luan et al. |
| 2018/0082679 A1 | 3/2018 | McCord et al. |
| 2018/0150605 A1 | 5/2018 | Co et al. |
| 2018/0247636 A1 | 8/2018 | Arik et al. |
| 2018/0254034 A1* | 9/2018 | Li ....................... G10L 15/183 |

(Continued)

FOREIGN PATENT DOCUMENTS

CN     108492818     9/2018

OTHER PUBLICATIONS

Fernandez, Raul, and Rosalind Picard. "Recognizing affect from speech prosody using hierarchical graphical models." Speech Communication 53.9-10 (2011): 1088-1103. (Year: 2011).*

(Continued)

*Primary Examiner* — Michael Ortiz-Sanchez
(74) *Attorney, Agent, or Firm* — Barry D. Blount

(57) ABSTRACT

An example system includes a processor to receive a linguistic sequence and a prosody info offset. The processor can generate, via a trained prosody info predictor, combined prosody info including a number of observations based on the linguistic sequence. The number of observations include linear combinations of statistical measures evaluating a prosodic component over a predetermined period of time. The processor can generate, via a trained neural network, an acoustic sequence based on the combined prosody info, the prosody info offset, and the linguistic sequence.

20 Claims, 8 Drawing Sheets

(56) References Cited

U.S. PATENT DOCUMENTS

| | | | |
|---|---|---|---|
| 2020/0394998 A1* | 12/2020 | Kim | G06N 3/08 |
| 2021/0074260 A1* | 3/2021 | Gopala | G10L 13/10 |
| 2021/0166679 A1* | 6/2021 | Ando | G10L 25/30 |
| 2021/0225357 A1* | 7/2021 | Zhao | G06F 40/30 |

OTHER PUBLICATIONS

Vincent Wan et al., "CHIVE: Varying Prosody in Speech Synthesis with a Linguistically Driven Dynamic Hierarchical Conditional Variational Network", Proceedings of the 36th International Conference on Machine Learning, Long Beach, California, PMLR 97, 2019.

Zhizheng Wu et al., "Merlin: An Open Source Neural Network Speech Synthesis System", 9th ISCA Speech Synthesis Workshop Sep. 13-15, 2016, Sunnyvale, USA.

RJ Skerry-Ryan et al., "Towards End-to-End Prosody Transfer for Expressive Speech Synthesis with Tacotron", arXiv, Mar. 24, 2018.

Wei-Ning Hsu et al., "Hierarchical Generative Modeling for Controllable Speech Synthesis", arXiv, Dec. 27, 2018.

"International Search Report and Written Opinion Issued in PCT Patent Application No. PCT/IB2020/058313", dated Dec. 16, 2020, 9 pages.

* cited by examiner

100

GENERATING ACOUSTIC SEQUENCES VIA NEURAL NETWORKS USING COMBINED PROSODY INFO

BACKGROUND

The present techniques relate to controlling prosody. More specifically, the techniques relate to controlling prosody via neural networks.

SUMMARY

According to an embodiment described herein, a system can include processor to receive a linguistic sequence and a prosody info offset. The processor can also further generate, via a trained prosody info predictor, combined prosody info including a plurality of observations based on the linguistic sequence. The plurality of observations include linear combinations of statistical measures evaluating a prosodic component over a predetermined period of time. The processor can also generate, via a trained neural network, an acoustic sequence based on the combined prosody info, the prosody info offset, and the linguistic sequence.

According to another embodiment described herein, a method can include receiving a linguistic sequence and a prosody info offset. The method can further include generating, via a trained prosody info predictor, combined prosody info including a plurality of observations based on the linguistic sequence. The plurality of observations include linear combinations of statistical measures evaluating a prosodic component over a predetermined period of time. The method can also further include generating, via a trained neural network, an acoustic sequence based on the combined prosody info, the prosody info offset, and the linguistic sequence.

According to another embodiment described herein, a computer program product for automatically controlling prosody can include computer-readable storage medium having program code embodied therewith. The computer readable storage medium is not a transitory signal per se. The program code executable by a processor to cause the processor to receive a linguistic sequence and a prosody info offset. The program code can also cause the processor to generate combined prosody info including a plurality of observations based on the linguistic sequence. The plurality of observations include linear combinations of statistical measures evaluating a prosodic component over a predetermined period of time. The program code can also cause the processor to generate an acoustic sequence based on the combined prosody info, the prosody info offset, and the linguistic sequence.

DETAILED DESCRIPTION

Text-to-speech (TTS) systems, such as sequence to sequence (seq2seq) neural TTS systems, may receive as an input linguistic sequences and output speech acoustic sequences. For example, the speech acoustic sequences may be represented by frame-wise speech parameters or by speech waveforms. Such systems can generate speech with close-to-natural speech quality with some variation in prosody. Prosody may include phoneme durations, intonation, and volume. However, such systems generate speech prosody implicitly, therefore prosodic control in such systems may be very limited. For example, if not guided, such systems may generate an output uttered with random speaking style and prosodic characteristics.

Moreover, in many applications, there may be a request to control the prosody, including. speaking style, emotional state, speaking rate, and expressiveness, at inference time. Semi-supervised approaches exploit prosodic/speaking style labeling, which may be partially or fully generated by human subjects. However, human labeling is expensive, error prone and time consuming In addition, very few labeled resources exist for speech synthesis. In exemplar-based prosody control approaches, the acoustic/prosodic realization of speech can be transferred from a given spoken example by any speaker using appropriate latent space representation. However, these approaches may not be feasible in most of real TTS applications. In unsupervised approaches, speech acoustics' latent space may be automatically trained. The latent parameters can be disentangled to enable their independent manipulation at inference time. However, the automatically trained latent representations may frequently be non-interpretable and heavily data-dependent. Moreover, their controllability and the synthesized speech quality may also be inconsistent.

According to embodiments of the present disclosure, a system can include a processor to receive a linguistic sequence and a prosody info offset. The processor can generate, via a trained prosody info predictor, combined prosody info including a number of observations based on the linguistic sequence. The observations may be linear combinations of statistical measures, evaluating a prosodic component over a predetermined period of time. The processor can also generate, via a trained neural network, an acoustic sequence based on the combined prosody info, the prosody info offset, and the linguistic sequence. Thus, embodiments of the present disclosure provide a fully automatic method that explicitly models prosody in a system and enables sentence-wise speaking pace and expressiveness control on a continuous scale. The techniques described herein also improve overall quality and expressiveness of synthesized speech.

Figure 1:
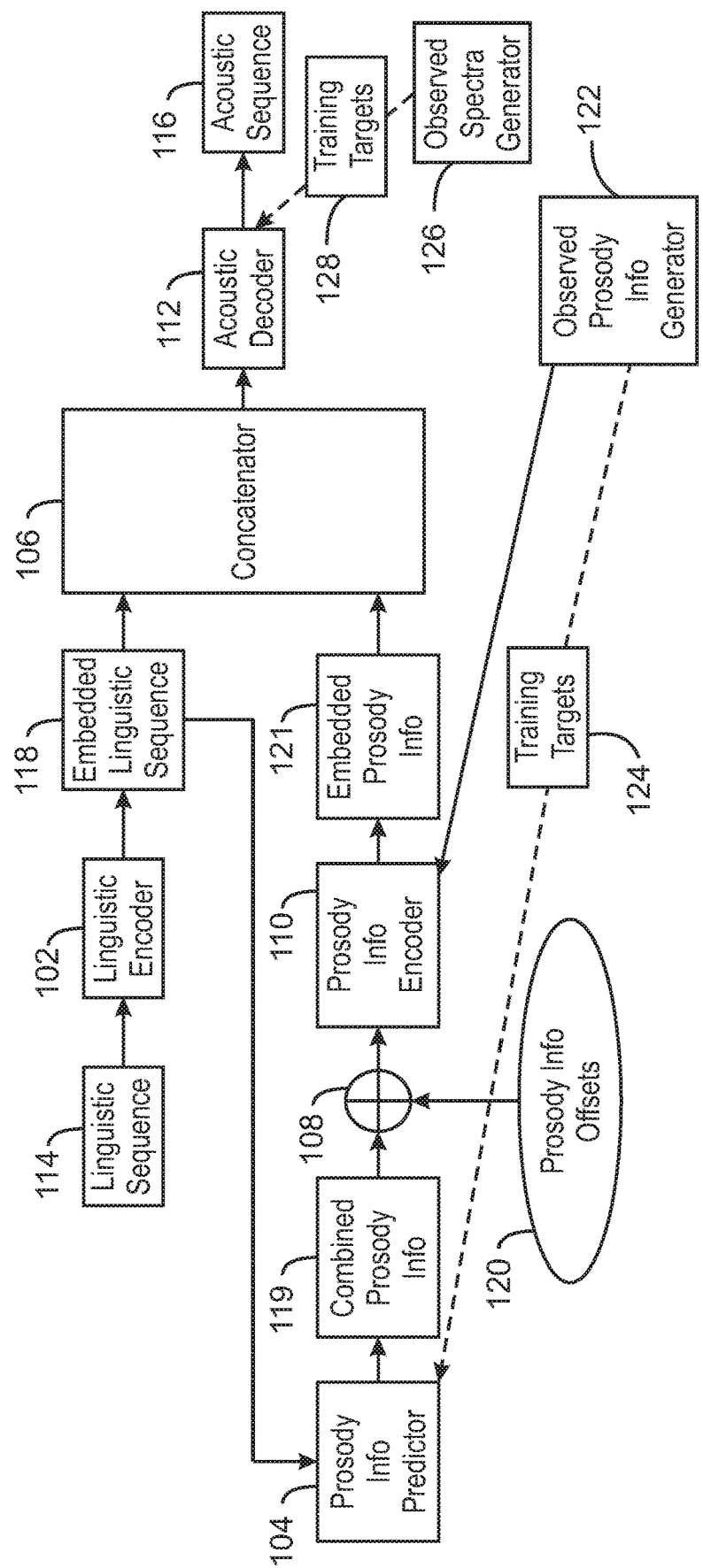
FIG. 1 is a block diagram of an example system for training a neural network to automatically control prosody using prosody info.

With reference now to FIG. 1, a block diagram shows an example system for training a neural network to automatically control prosody using embedded prosody info. The system 100 may be used to implement the methods 300 and 400 and can be implemented using the computing device 500 of FIG. 5 or the computer-readable medium 800 of FIG. 8. As one example, the system 100 may be a neural sequence to sequence network with attention. The system 100 of FIG. 1 includes a linguistic encoder 102. For example, the linguistic encoder 102 may include a linear embedding layer, followed by one-dimensional convolutional layers, and a long short-term memory (LSTM) layer. As used herein, the encoder's output includes a sequence of embedding vectors, i.e. a sequence of learned continuous vector representations of discrete input vectors. Long short-term memory is an artificial recurrent neural network architecture. LSTMs have feedback connections and is intended to process sequences of data. The system 100 includes a prosody info predictor 104 communicatively coupled to the linguistic encoder 102. For example, the prosody info predictor 104 may have embedded linguistic sequences fed into a stacked LSTM (128×3), followed by a linear fully-connected (FC) layer. The system 100 also includes a concatenator 106 communicatively coupled to the prosody info predictor 104. The system 100 also further includes a combiner 108 communicatively coupled to the prosody info predictor 104. The system 100 includes a prosody info encoder 110 communicatively coupled to the prosody info predictor 104 and the concatenator 106. For example, the prosody info encoder 110 may include an FC layer followed by a tan h nonlinearity. The system 100 also further includes an acoustic decoder 112 communicatively coupled to the concatenator 106. For example, the acoustic decoder 112 may include an auto regressive mel-spectrum predictor. In some examples, the acoustic decoder 112 may include two stacked LSTMs layers with an attention mechanism. In various examples, the final layers of the acoustic decoder 112 are fully connected layers (FC) that output 80-dimensional mel spectrogram sequence and a 1-dim stop bit sequence. The system 100 is shown receiving a linguistic sequence 114 and outputting an acoustic sequence 116. The linguistic encoder 102 is shown generating an embedded linguistic sequence 118. The prosody info predictor 104 is shown generating combined prosody info 119. The combiner 108 is shown receiving the combined prosody info 119 and a set of prosody info offsets 120. The prosody info encoder 110 is shown generating embedded prosody info 121. The system 100 includes an observed prosody info generator 122 shown sending training targets 124 to the prosody info predictor 104 and the prosody info encoder 110. The system 100 also includes an observed spectra generator 126 shown sending training targets 128 to the acoustic decoder 112.

In the example of FIG. 1, the system 100 may be trained to receive a linguistic sequence 114 and output an acoustic sequence 116. In particular, the linguistic sequence 114 input to the seq2seq neural TTS systems may be augmented with prosody info. Prosody info, as used herein, refers to a set of interpretable temporal observations. For example, the observations may be evaluated globally and/or locally and hierarchically at different temporal spans. Each observation is a linear combination or set of linear combinations of statistical measures, evaluating a prosodic component over a predetermined period of time. In human speech, the same verbal information can be conveyed in many ways. The sequence of linguistic embeddings 118 encapsulates all the verbal information used in the system, while the prosody information observations in the form of training targets 124 extracted from the recordings during the training, provide additional hints on how to convey that verbal information. In various examples, the observations, included in the prosody info may be disentangled and easily interpretable. For example, the having distinct components for pace, pitch and loudness. In some examples, any number of components may be used for the observations. For example, loudness control may be omitted if a voice corpus has uniform loudness, leaving pace and pitch control as two components used.

In various examples, the linguistic sequence 114 may be a phonetic sequence of symbols represented by 1-hot or sparse binary vectors, describing the input phonemes. As one example, the linguistic sequence 114 may be a phonetic sequence of indices corresponding to a discrete alphabet of phonemes. In various examples, the acoustic sequence 116 may be a sequence of acoustic parameters. For example, the acoustic sequence 116 may include frame-wide spectrograms or constant frame spectrograms. In various examples, the spectrograms may be convertible to speech using vocoding. As one example, the acoustic sequence 116 may be converted to speech using any suitable vocoder. A vocoder is a codec used to that analyzes and synthesizes the human voice signal for audio data compression, multiplexing, voice encryption, voice transformation, etc. As one example, the vocoder may be a neural network vocoder.

Still referring to FIG. 1, at training and inference stages, the linguistic encoder 102 can receive a linguistic sequence 114 and generate a sequence of linguistic embeddings 118. The embedding may be a vector representation of a phoneme in a certain phonetic context. For example, the vector representation may be in the form of 128 numbers. In various examples, the form of the vector representation is learnable during joint training of the neural network 100. The sequence of linguistic embeddings 118 may be sent to both the concatenator 106 and the prosody info predictor 104.

At a training stage, the system 100 may receive training targets 124 and 128 from an observed prosody info generator 122 and an observed spectra generator 126, respectively. For example, an observed prosody info vector may be fed to the system. In various examples, a prosodic info vector sequence is automatically calculated for a training set of input utterances. The utterances may include both recordings and transcriptions for the recordings. In some examples, the transcriptions may be automatically generated. For example, a pitch and energy trajectory may be calculated using pitch and energy estimators, and an automatic phonetic alignment is applied to divide the time signal to phoneme, syllable, word, and phrase segments. The pitch, duration, and energy observations may then be derived for various time spans. The observations may then be aligned and combined with each other to generate combined prosody info vector sequence. In some examples, the prosody info may be set to zero for the first five epochs of training to ease alignment convergence at initial steps of the training. As one example, the prosody info may be set to zero for about 1500 mini-batch steps.

In various examples, after the training is complete, the prosody info predictor 104 can be trained separately, by minimizing a mean squared error (MSE) loss. For example, the prosody info predictor 104 may be fed with the sequence of linguistic embeddings 118 and predict the combined prosody info out of the sequence of linguistic embeddings 118. In some examples, the prediction is done with a 3-layered stacked LSTM having 128 cells at each layer, followed by a linear layer that produces the prosody info vector with an output size of 2. In some examples, the prosody info predictor 104 can be jointly trained with the rest of the system 100 as a sub-network using multi-target training. For example, both sets of training targets 124 and 128 may be used to jointly train the prosody info predictor 104 and the system 100. In various examples, an additional loss may be added to a loss associated with the output acoustic sequence loss to jointly train the prosody info predictor 104. In some examples, the prosody info predictor 104 may be separately trained. For example, the prosody info predictor 104 may be separately trained to a seq2seq acoustic neural network to predict the combined prosody info from the linguistic sequence 114. In some examples, the prosody info observations may also include acoustic observations. For example, acoustic observations may include observations of other non-lingual aspects of speech acoustics that may correlated with a speaking style, such as speech breathiness, hoarseness, vocal effort, etc.

At the inference stage, the prosody info predictor 104 receives the sequence of linguistic embeddings 118 and generates combined prosody info 119. For example, the combined prosody info 119 include a number of observations. The observations include linear combinations of statistical measures evaluating a prosodic component over a predetermined period of time. In various examples, the observations may be evaluated globally or locally and hierarchically at different temporal spans. For example, a global observation may be at the utterance level. The hierarchical locally evaluated observations may be at the level of each paragraph, sentence, phrase, word, syllable, or phoneme segment. As used herein, a segment refers to a time span within this hierarchical temporal structure of paragraph/sentence/phrase/word/syllable/phone. The observations may then be aligned and combined with each other, by concatenation or summation, to generate combined prosody info. The combined prosody info 119 may then be embedded via the prosody info encoder 110 to generate embedded prosody info 121.

In various examples, the observation set may include at least a log-pitch observation within a segment, a sub-segment log-duration observation within a segment, a log-energy observation within a segment, or any combination thereof. For example, the log-pitch observation may be the span of log-pitch evaluated as 0.95-quantile minus 0.05-quantile of an utterance log-pitch trajectory. As used herein, a sub-segment refers to a segment that is deeper in that hierarchy compared to another segment. For example, a log-duration observation may be the log of the average phoneme duration (excluding silences) as a pace measure of an utterance. In some examples, the sub-segment log-duration observation may measure the duration of a word within a phrase. In various examples, each of the observations may be a linear combination of statistical measures. Each of the observations may include at least some form of statistical measure, such as a mean, a set of quantiles, a span, a standard deviation, a variance, or any combination thereof. In various examples, the observations are normalized per speaker. The observations are discussed in greater detail with respect to FIG. 2.

The prosody info predictor 104 thus generates a set of observations used to describe various prosodic parameters for the input linguistic sequence. Because these observations are normalized and tractable, one or more prosody info offsets 120 may be applied during inference to adjust prosody of the final acoustic sequence 116. The prosody info can be deliberately changed by adding a component-wise offset in the [−1, 1] range. For example, an utterance, paragraph, sentence, phrase, or word can be made slower by adjusting a corresponding sub-segment log-duration observation towards −1 or faster by adjust towards 1. Similarly, the variation in pitch or loudness of an entire utterance, or any paragraph, sentence, phrase, or word thereof, may be adjusted by modifying a corresponding log-pitch observation or log-energy observation towards −1 or 1 to make the output acoustic sequence 116 more monotone or expressive, respectively.

In various examples, the combined prosody info vector is embedded into a 2-dimensional latent space and concatenated with each vector in the linguistic encoder output sequence. For example, the prosody info vector may be embedded by a single fully connected unbiased layer with tan h nonlinearity. Consequently, the decoder is exposed to the prosody info through the input context vector.

The combined prosody info observations are thus further fed into the main seq2seq acoustic neural network. The acoustic decoder 112 may be a neural network that receives the concatenated sequence from the concatenator 106 and generates an acoustic sequence 116.

As one example, the system 100 may have a two-dimensional global (utterance-wise) observation: log-pitch span, and median phone log-duration concatenated with two-dimensional word-level observation: log-pitch span, and median phone log-duration. All the observations may be normalized to [4:1]. Due to the global observations, the system user can control global speech pace and expressiveness. For example, a user can add a positive global duration modifier to slow-down the speech or to make the speech more articulated. Moreover, a user can add a positive global pitch-span modifier to increase the speech expressiveness. Using the word-level observations in the combined prosody info, the system 100 can control a desired word emphasis. For example, such word emphasis may be useful in dialogue applications. In some examples, a user may deliberately apply the positive duration modifier and the positive pitch span modifier to a subsequence of the observations, corresponding to the desired word. In experiments with the proposed prosody information control on several voice corpora, an example system was responsive to component-wise prosody info inference-time modifications, successfully slowing down or speeding up as a response to the pace component modification and increasing or decreasing expressivity in response to the pitch component modification.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.).

Figure 2:
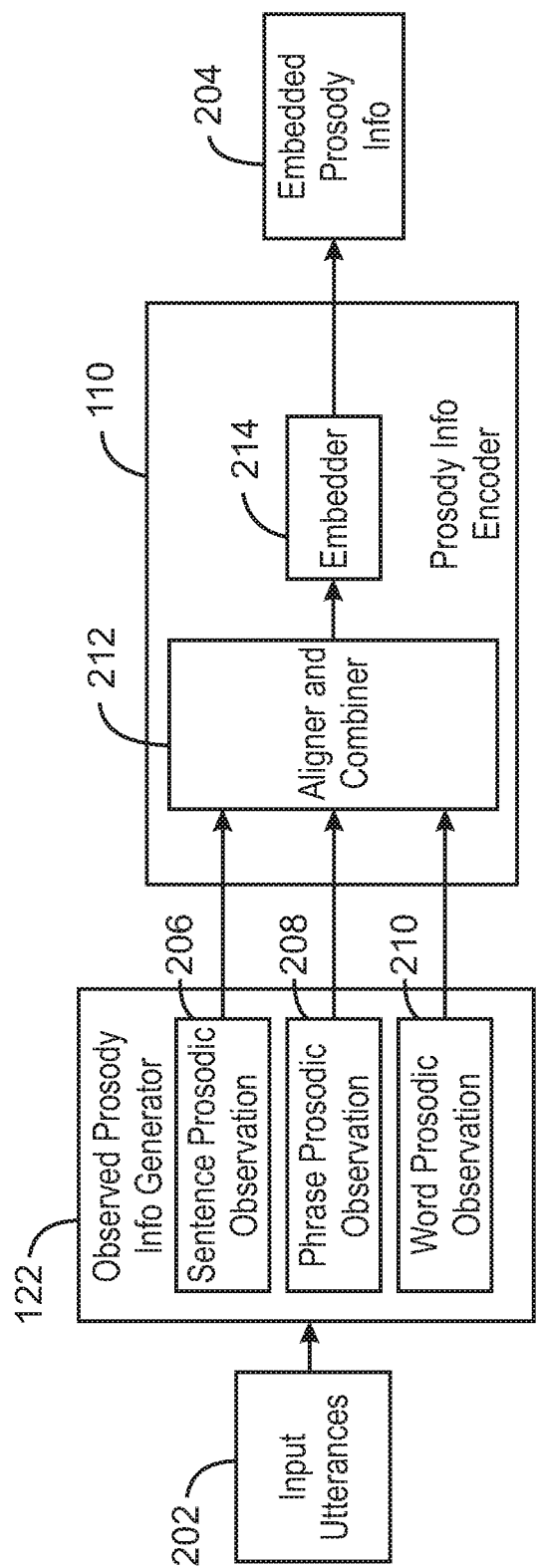
FIG. 2 is a block diagram of an example system for generating embedded prosody info.

With reference now to FIG. 2, a block diagram shows an example system for encoding prosody info. The example system 200 may be used in implementing the method of FIG. 3 and can be implemented using the computing device 500 of FIG. 5 or the computer-readable medium 800 of FIG. 8.

The system 200 of FIG. 2 includes a prosody info encoder 110 coupled to an observed prosody info generator 122. The system 202 may receive input utterances 202 and output embedded prosody info 204. For example, the input utterances 202 may be training data used to train the system 100 of FIG. 1 using the embedded prosody info 204. In various examples, the input utterances 202 may include recorded paragraphs, sentences, words, etc.

In the example of FIG. 2, the observed prosody info generator 122 receives input utterances and generates a set of prosodic observations. As shown in FIG. 2, the prosodic observations can include observations at various levels, including a sentence prosodic observation 206, a phrase prosodic observation 208, and a word prosodic observation 210, among other possible levels of prosodic observations. In various examples, each of the types of prosodic observations 206, 208, 210 may include at least some of the following: a log-pitch observation within a segment, a sub-segment log-duration observation within a segment, and a log-energy observation within a segment. For example, other types of prosodic observations may be breathiness, noise level, nasality, voice quality, etc. For example, breathiness may be evaluated by harmonic to noise ratio at voiced speech parts. In some examples, a noise level may be evaluated by SNR estimation at silences. In various examples, a nasality may be evaluated using average formant analysis. In some examples, a voice quality may be evaluated using glottal pulse modeling and analysis of glottal closure and opening intervals for voiced speech parts. For example, the glottal pulse modeling used may be Liljencrants-Fant glottal pulse modeling. In general, each of the observations may be a linear combination of statistical measures. Each observation may include a statistical measure such as a mean, set of quantiles, a standard deviation, a variance, or any combination thereof. For example, a set of quantiles may be in the form: [0.1, 0.5, 0.9]. As described above, the observations may be properly normalized per speaker. For example, the efficient span for each of the observations may be normalized to [−1, 1]. The efficient span may be calculated as: [median−3*std, median+3*std], where std is the standard deviation of the set. In some examples, a span may expressed using quantiles, such as the span: 0.95-quantile minus 0.05-quantile.

In various examples, the aligner and combiner 212 can align and combine the hierarchical observations 206, 208, and 210. For example, the aligner and combiner 212 can align and combine the hierarchical observations 206, 208, and 210 by summation or concatenation to produce combined prosody info, which may include a sequence of observation vectors, synchronized with input linguistic sequence.

Still referring to FIG. 2, the embedder 214 may embed the combined prosody info from the aligner and combiner 212 to generate embedded prosody info 204. For example, the embedded prosody info 204 may include a single embedding vector per utterance or a sequence of embedding vectors, synchronized with input linguistic sequence. In various examples, the embedded prosody info 204 may then be used for training an acoustic decoder, as described in FIG. 1.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional input, types of observed prosody info, or additional embedded prosody info, etc.). For example, during inference, instead of observed prosody generator 122, a prosody info predictor may be fed either into the prosody info encoder 110 or into the embedder 214.

Figure 3:
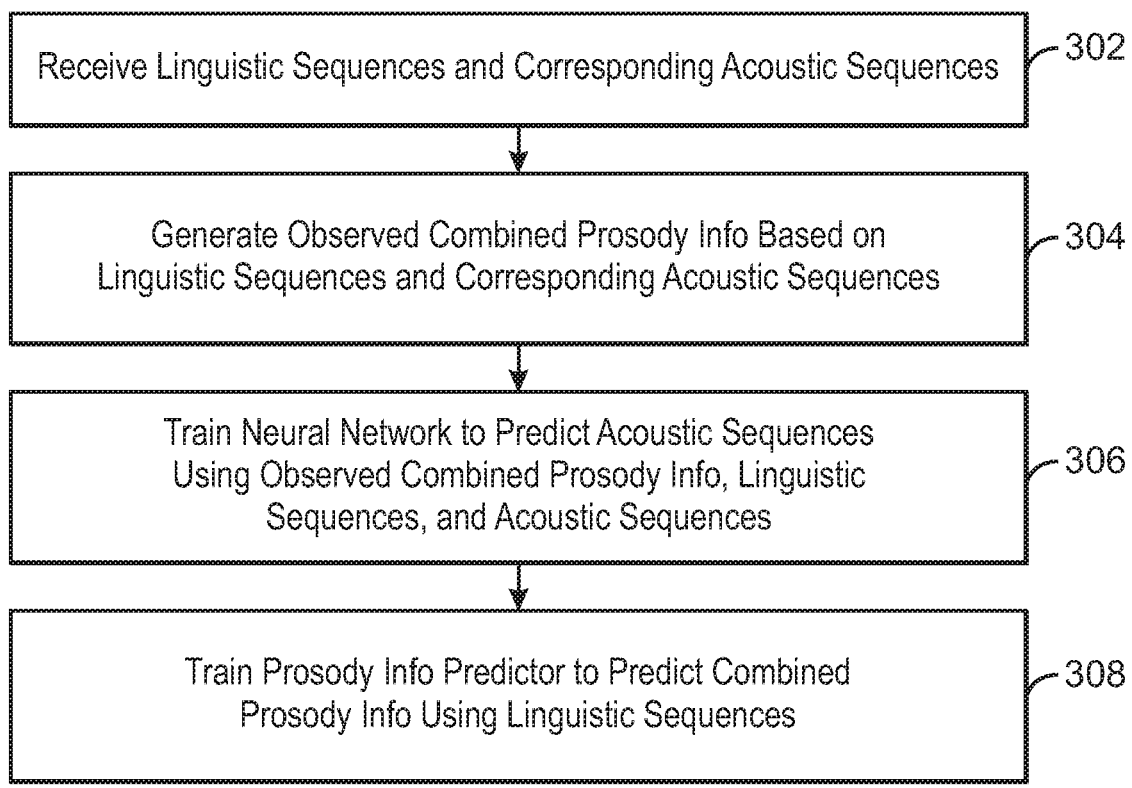
FIG. 3 is a block diagram of an example method that can train a neural network to automatically control prosody using prosody info.

FIG. 3 is a process flow diagram of an example method that can train a neural network to automatically control prosody using embedded prosody info. The method 300 can be implemented with any suitable computing device, such as the computing device 500 of FIG. 5 and is described with reference to the systems 100 and 200 of FIGS. 1 and 2. For example, the method 300 can be implemented by the trainer module 536 of the computing device 500 of FIG. 5 or the trainer module 818 of the computer-readable medium 800 of FIG. 8.

At block 302, linguistic sequences and the corresponding acoustic sequences are received. For example, the linguistic sequences may correspond to input utterances used for training.

At block 304, observed combined prosody info is generated based on the linguistic sequences and the corresponding acoustic sequences. For example, the observed combined prosody info may be a sequence of observed prosody info for various time spans automatically calculated from and corresponding to input utterances used for training. The observed prosody info can be temporally aligned and combined, for example by using concatenation or summation, to obtain a sequence of observed combined prosody info. In various examples, the observed prosody info may include any combination of observations including statistic measures associated with the input utterances, such as a log-pitch observation within a segment, a sub-segment log-duration observation within a segment, a log-energy observation within a segment, or any combination thereof.

At block 306, the observed combined prosody info together with the linguistic and the acoustic sequences are used to train a neural network to predict acoustic sequences. For example, the neural network may include a prosody info encoder, a linguistic encoder and an acoustic decoder. As one example, the embedded prosody info and embedded linguistic sequence are fed into the acoustic decoder outputting mel-spectrogram sequence. For example, the neural network may be trained using the mean squared error (MSE) loss of the mel-spectrum.

At block 308, a prosody info predictor is trained to predict combined prosody info observations using linguistic sequences. In some examples, the prosody info predictor can be trained to predict hierarchical prosody info observations, which can be further aligned and combined to generate combined prosody info. In various examples, or the prosody info predictor can be trained to directly predict the combined prosody info observations. In various examples, the prosody info predictor may be separately or jointly trained with the decoder. As one example, the decoder may be trained separately in block 306. The prosody info predictor may then be trained based on the linguistic sequences and training targets. In some examples, the prosody info predictor may be trained based on an embedded linguistic sequences from a trained linguistic encoder.

As one example, the prosody info predictor may be combined with a sequence to sequence mel-spectral feature prediction module. For example, the mel-spectral feature prediction module may be based on the Tacotron2 architecture, released 2018, including a convolutional encoder with a terminal recurrent layer implemented using a bidirectional LSTM. The mel-spectral feature prediction module can encode linguistic sequences to embedded linguistic sequences, cascaded with the autoregressive attentive decoder that expands the embedded linguistic sequence to a sequence of fixed-frame mel-spectral feature vectors.

In particular, the Tacotron2 decoder predicts one spectral frame at a time from the pre-net-processed previous spectral frame, $s_p$, conditioned on the input context vector, $x_c$, generated by an attention module. The decoder generates its hidden state vector, $h_c$, with two-layered stacked LSTM network. The hidden state vector $h_c$, combined with the input context vector $x_c$, is fed to the final linear layers to produce the current mel-spectrum and the end-of-sequence flag. At the end, there may also be a convolutional post-net that refines the whole utterance mel-spectrogram to improve fidelity.

The Tacotron2 model can consume text characters directly. However, in some examples, the system may be fed with the sequence of symbols from an extended phonetic dictionary to simplify training. For example, the extended phonetic dictionary may include the phone identity, lexical stress and phrase type, enriched with distinct word break and silence symbols. The lexical stress may be a 3-way parameter, including primary, secondary, unstressed. The phrase type may be a 4-way parameter including affirmative, interrogative, exclamatory, and "other" values. In some examples, this linguistic input sequence may be generated by an external grapheme to phoneme rule-based TTS Front End module, such as the unit selection TTS, released 2006.

In some examples, a better synthesized speech quality may be obtained by incorporating the mean square error (MSE) applied to the difference between the current and the previous mel-spectra into the final system loss. For example, given the predicted mel-spectrum $y_t$ at time t before the post-net, the final predicted mel-spectrum $z_t$ at time t, and be the mel-spectrum target $q_t$ at time t, the spectral loss may be calculated using the Equation:

$$Loss_{spc} = 0.5 MSE(y_t, q_t) + 0.25 MSE(z_t, q_t) + 0.25 MSE(z_t - z_{t-1}, q_t - q_{t-1})$$  Eq. 1

In various examples, the training procedure may follow the teacher-forcing approach, as opposed to the inference procedure, where the prediction is autoregressive. For example, the prediction of the current mel-spectrum is performed based on the real previous mel-spectrum and processed by the pre-net. In some examples, a double feed may be applied during the training. For example, the decoder's pre-net may be fed with both the true previous mel-spectrum and the predicted one, concatenated together. At inference time, when the true frames are not available, the predicted mel-spectrum may be simply duplicated. While increasing the total network size by only 0.1%, this modification reduces the total model regression loss by about 15%, as tested on two professionally recorded U.S. English speech corpora of 13 and 22 hours.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
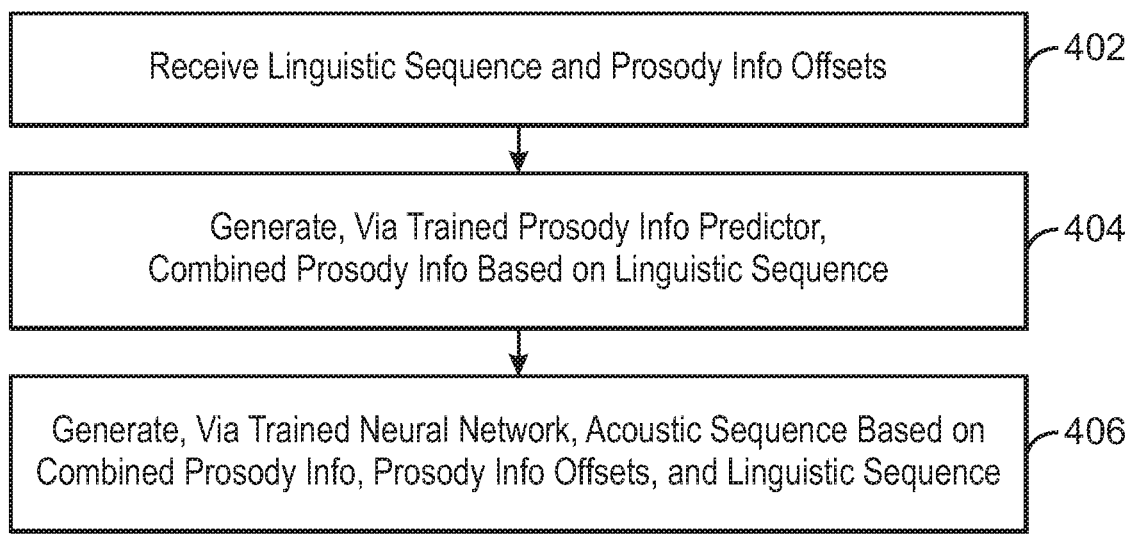
FIG. 4 is a block diagram of an example method that can generate acoustic sequences with automatically controlled prosody.

FIG. 4 is a process flow diagram of an example method that can generate sequences with automatically controlled prosody. The method 400 can be implemented with any suitable computing device, such as the computing device 500 of FIG. 5 and is described with reference to the systems 100 and 200 of FIGS. 1 and 2. For example, the method 400 can be implemented by the computing device 500 and the computer-readable medium 800 of FIGS. 5 and 8.

At block 402, a linguistic sequence and prosody info offsets are received. For example, the linguistic sequence may be a sequence of text. The prosody info offsets may be a set of external component-by-component modifications used to deliberately shift prosodic characteristics of synthesized speech. For example, the prosody info offsets may be used to change speech pace, pitch variability, volume variability, etc.

At block 404, combined prosody info is generated based on the linguistic sequence via a trained prosody info predictor. For example, the combined prosody info may include a number of observations. The observations include linear combinations of statistical measures evaluating a prosodic component over a predetermined period of time. For example, the observations may be evaluated at an utterance level. In some examples, the observations are evaluated locally and hierarchically at different temporal spans. In various examples, the observations can further be temporally aligned and combined to obtain the combined prosody info observations. Alternatively, the combined prosody info can be directly predicted from the linguistic sequence. In some examples, the prosody info may be generated based on an embedded linguistic sequence. In some examples, the embedded linguistic sequence may be an embedded sequence of discrete variables, i.e. a discrete linguistic sequence, mapped to a continuous embedding space.

At block 406, an acoustic sequence is generated based on the combined prosody info, the prosody info offsets, and the linguistic sequence via trained neural network. For example, the trained neural network may include a prosody info encoder, a linguistic encoder, and an acoustic decoder. In some examples, the combined prosody info components are modified based on the prosody info offset. For example, the prosody info offsets may be added to corresponding observations. In some examples, the combined prosody info passes through the prosody info embedder to generate the embedded prosody info. For example, the prosody info embedder may align, combine, and embed the observations to generate the embedded prosody info. The embedded prosody info may then be concatenated with the linguistic sequence or the embedded linguistic sequence and used by a decoder to generate the acoustic sequence.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the method 400 may include generating an audio based on the acoustic sequence.

In some scenarios, the techniques described herein may be implemented in a cloud computing environment. As discussed in more detail below in reference to at least FIGS. 5-8, a computing device configured to automatically control prosody using embedded prosody info may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
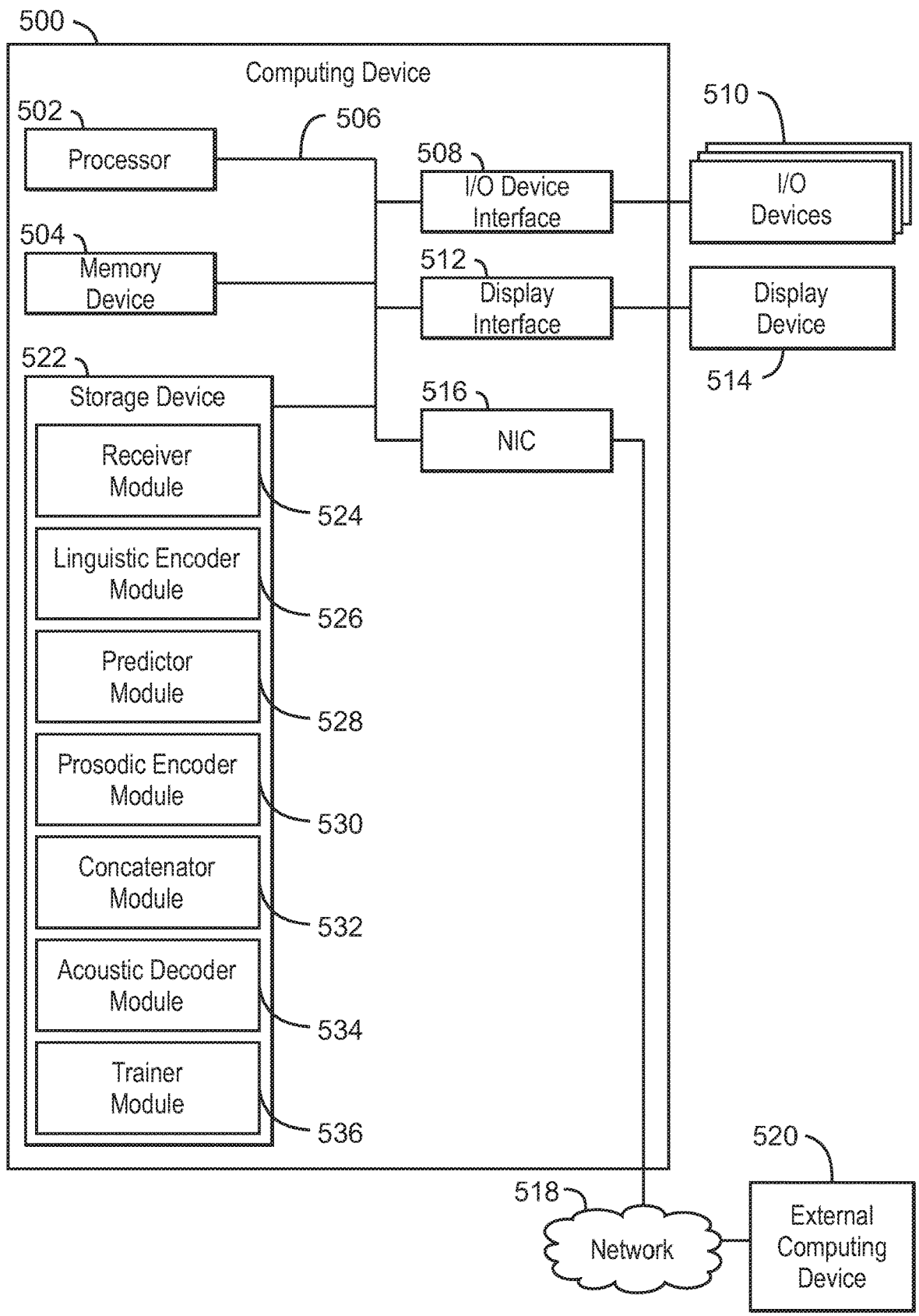
FIG. 5 is a block diagram of an example computing device that can automatically control prosody using prosody info.

FIG. 5 is block diagram of an example computing device that can automatically control prosody using embedded prosody info. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external web-server 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include a receiver module 524, a linguistic encoder module 526, a predictor module 528, a prosodic encoder module 530, a concatenator module 532, an acoustic decoder module 534, and a trainer module 536. The receiver module 524 can receive a linguistic sequence and a prosody info offset. For example, the linguistic sequence may be a sequence of text. The linguistic encoder module 526 can generate an embedded linguistic sequence based on the received linguistic sequence. The predictor module 528 can generate combined prosody info including a number of observations over various periods of time based on the linguistic sequence or the embedded linguistic sequence. The observations can be aligned with the linguistic sequence and combined by summation or concatenation. The observations include linear combinations of statistical measures evaluating a prosodic component over a predetermined period of time. For example, the observations may be a linear combination or set of linear combinations of statistical measures evaluating a pace component, a pitch component, a loudness component, or any combination thereof. In some examples, the observations may include a sentence prosodic observation, a phase prosodic observation, and a word prosodic observation, or any combination thereof. The prosodic encoder module 530 can modify the observations based on the prosody info offset to adjust a prosody of the acoustic sequence in a particular predetermined manner. The prosodic encoder module 530 can also embed the observations to generate embedded prosody info. The concatenator module 532 can concatenate the embedded prosody info with the embedded linguistic sequence. The acoustic decoder module 534 can generate an acoustic sequence based on the combined prosody info, the prosody info offset, and the linguistic sequence. For example, the decoder module 534 can generate an acoustic sequence based on the combined prosody info observations and the prosody info offset. The trainer module 536 can train the prosody info predictor based on observed prosody info extracted from unlabeled training data. For example, the trainer module 536 can train the linguistic encoder module 526 and the acoustic decoder module 534 based on observed spectra extracted from recordings during training. In some examples, the trainer module 536 can train the prosody info predictor based on an embedded linguistic sequence generated by the system trained with the observed prosody info.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). Furthermore, any of the functionalities of the receiver 524, the linguistic encoder module 526, the predictor module 528, the prosodic encoder module 530, the concatenator module 532, the acoustic decoder module 534, and the trainer module 536, may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the receiver module 524, linguistic encoder module 526, and predictor module 528, the prosodic encoder module 530, the concatenator module 532, the acoustic decoder module 534, and the trainer module 536 can be implemented with logic, wherein the logic, as referred to herein, can include any suitable hardware (e.g., a processor, among others), software (e.g., an application, among others), firmware, or any suitable combination of hardware, software, and firmware.

Figure 6:
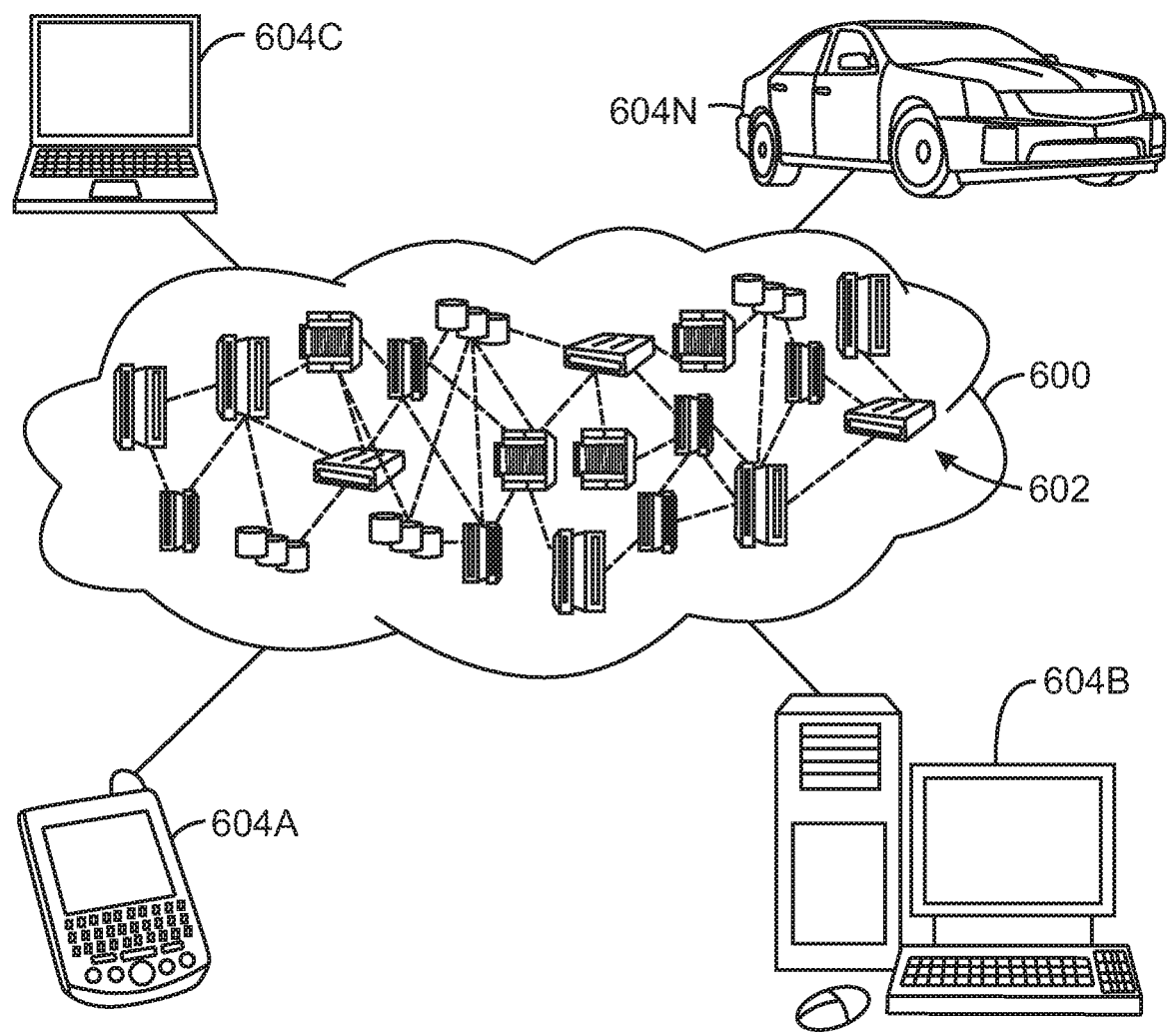
FIG. 6 is a diagram of an example cloud computing environment according to embodiments described herein.

Referring now to FIG. 6, illustrative cloud computing environment 600 is depicted. As shown, cloud computing environment 600 comprises one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
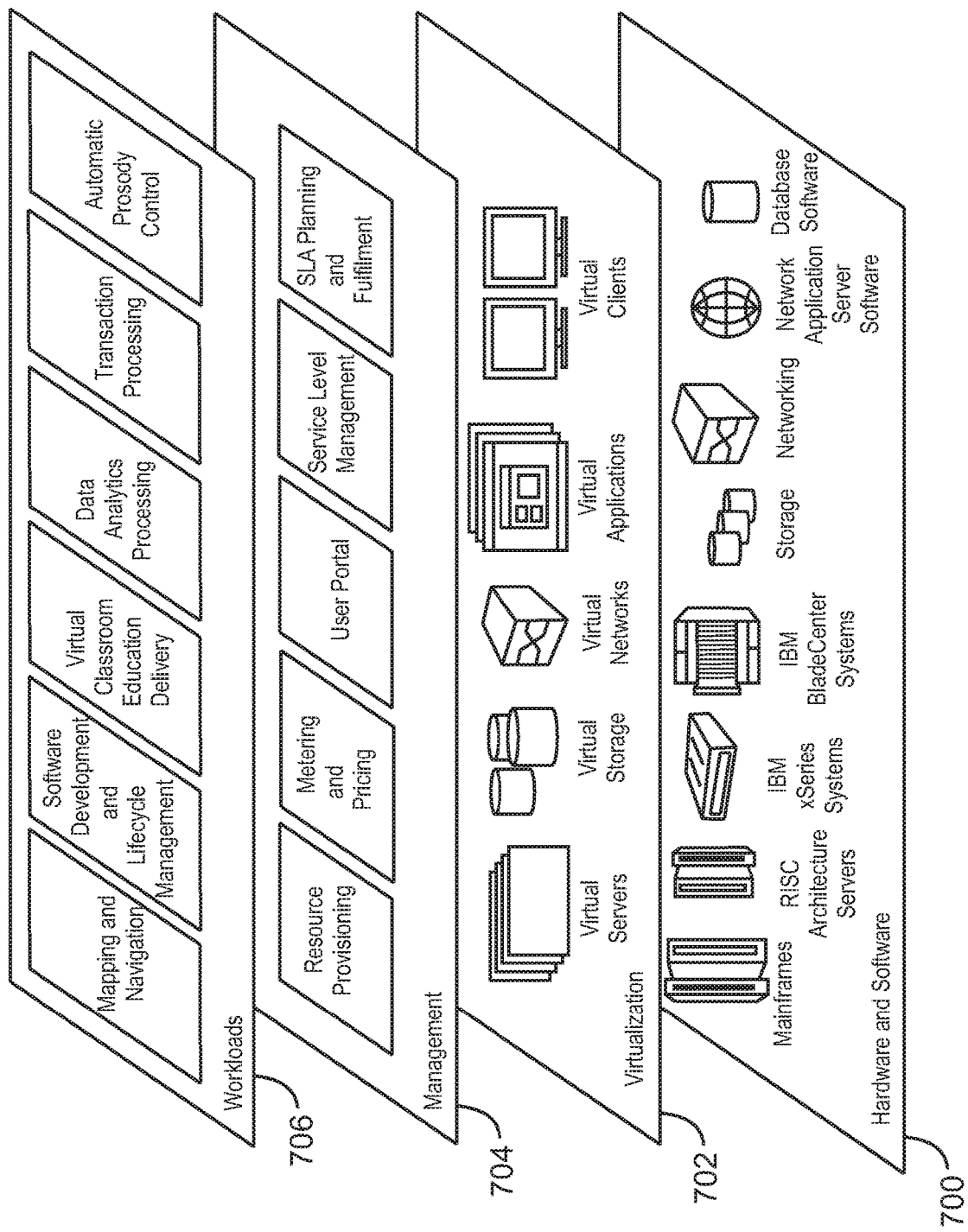
FIG. 7 is a diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 700 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 702 provides an abstraction layer from which the following examples of virtual entities may be provided: virtual servers; virtual storage; virtual networks, including virtual private networks; virtual applications and operating systems; and virtual clients. In one example, management layer 704 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 706 provides examples of functionality for which the cloud computing environment may be utilized. Examples of workloads and functions which may be provided from this layer include: mapping and navigation; software development and lifecycle management; virtual classroom education delivery; data analytics processing; transaction processing; and automatic prosody control.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring now to FIG. 6, a block diagram is depicted of an example tangible, non-transitory computer-readable medium 600 that can automatically control prosody using embedded prosody info. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the methods 300 and 400 of FIGS. 3 and 4.

Figure 8:
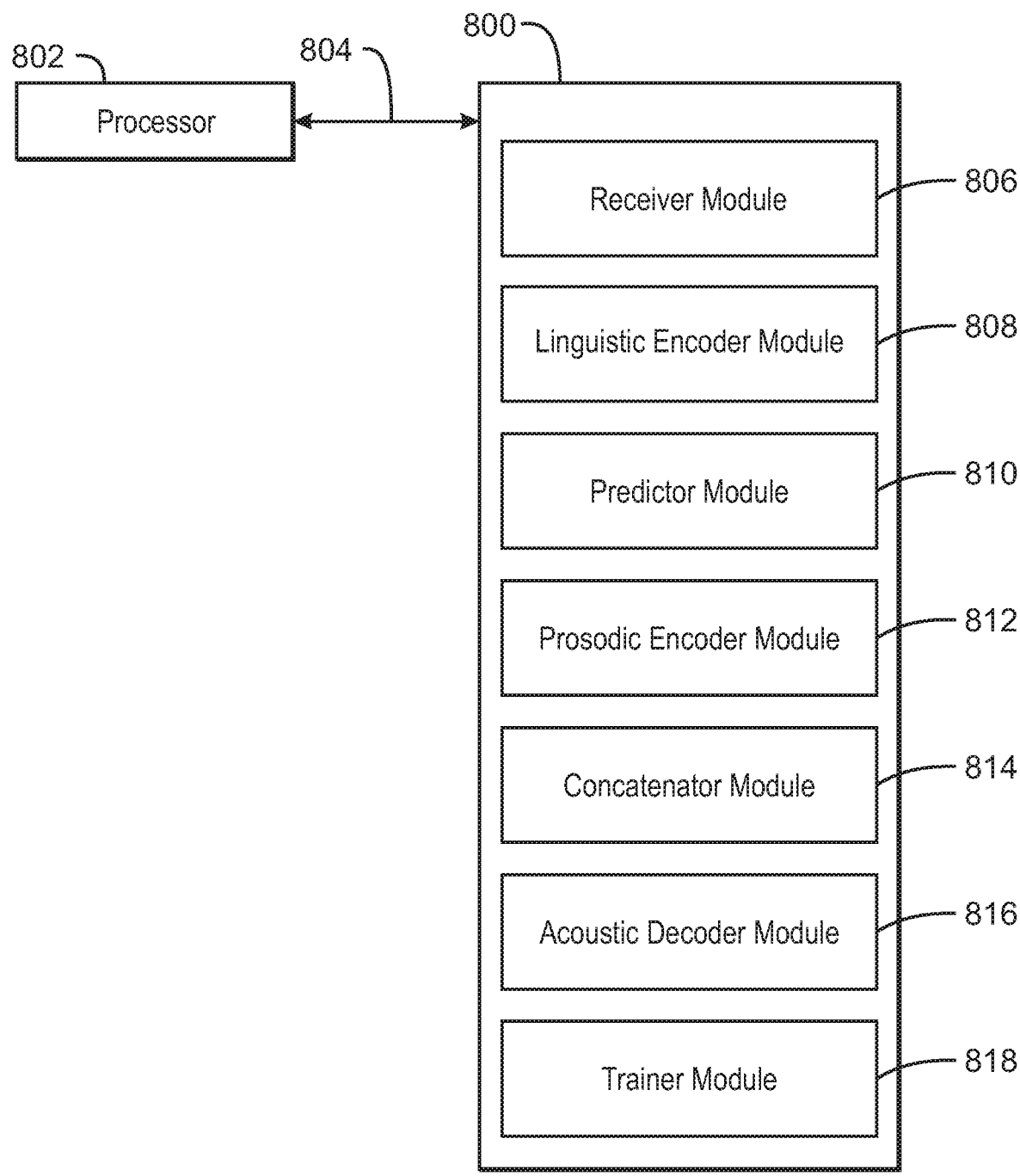
FIG. 8 is an example tangible, non-transitory computer-readable medium that can automatically control prosody using prosody info.

The various software components discussed herein may be stored on the tangible, non-transitory, computer-readable medium 800, as indicated in FIG. 8. For example, a receiver module 806 includes code to receive a linguistic sequence and a prosody info offset. A linguistic encoder module 808 includes code to generate an embedded linguistic sequence based on the linguistic sequence. The predictor module 810 also includes code to generate combined prosody info including observations over various periods of time based on the linguistic sequence. The observations can be aligned with the linguistic sequence and combined by summation or concatenation. The observations include linear combinations of statistical measures evaluating a prosodic component over a predetermined period of time. A prosodic encoder module 812 includes code to encode the observations to generate the embedded prosody info. In some examples, the prosodic encoder module 812 includes code to modify the observations based on the prosody info offset. For example, the prosodic encoder module 812 includes code to add the prosody info offset to corresponding observations. A concatenator module 814 includes code to concatenate the embedded prosody info with the embedded linguistic sequence. An acoustic decoder module 816 includes code to generate an acoustic sequence based on the embedded prosody info, the prosody info offset, and the linguistic sequence or the embedded linguistic sequence. A trainer module 818 includes code to train the prosody info predictor based on observed prosody info extracted from unlabeled training data. It is to be understood that any number of additional software components not shown in FIG. 8 may be included within the tangible, non-transitory, computer-readable medium 800, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application. For example, computer-readable medium 800 may also include code to generate an audio based on the acoustic sequence.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive a linguistic sequence and a prosody info offset comprising an adjustment for a target observation at a target time span;
encode, via a linguistic encoder, the linguistic sequence to generate an embedded linguistic sequence comprising a vector representation of a phoneme in a phonetic context;
generate, via a trained prosody info predictor, combined prosody info comprising a plurality of observations based on the linguistic sequence, wherein the plurality of observations comprise linear combinations of statistical measures evaluating a plurality of prosodic components over a plurality of hierarchical time spans, wherein the observations are normalized;
modify the combined prosody info based on the prosody info offset, wherein the prosody info offset adjusts the target observation of the plurality of observations at the specified time span of the hierarchical time spans;
embed the modified combined prosody info into a latent space to generate embedded prosody info; and
generate, via a trained neural network, an acoustic sequence based on the embedded prosody info concatenated with the linguistic embedding, wherein a prosodic characteristic of the generated acoustic sequence is adjusted based on the prosody info offset.

2. The system of claim 1, wherein the processor is to train the prosody info predictor based on observed prosody info automatically extracted from unlabeled training data via an observed prosody info generator.

3. The system of claim 1, wherein the processor is to train the prosody info predictor based on the embedded linguistic sequence generated by the system trained with the observed prosody info.

4. The system of claim 1, wherein the processor is to train the neural network based on observed spectra extracted from recordings during training, the neural network comprising a sequence-to-sequence neural network including a prosody info encoder, a linguistic encoder, and an acoustic decoder.

5. The system of claim 1, wherein the processor is to modify the plurality of observations based on the prosody info offset to adjust the prosodic characteristic of the acoustic sequence in a particular predetermined manner.

6. The system of claim 1, wherein the prosodic component comprises a pace component, a pitch component, a loudness component, or any combination thereof.

7. The system of claim 1, wherein the plurality of observations comprise a log-pitch observation within each segment, a sub-segment log-duration observation within each segment, and a log-energy observation within each segment of the linguistic sequence.

8. A computer-implemented method, comprising:
receiving a linguistic sequence and a prosody info offset comprising an adjustment for a target observation at a target time span;
encoding, via a linguistic encoder, the linguistic sequence to generate an embedded linguistic sequence comprising a vector representation of a phoneme in a phonetic context;
generating, via a trained prosody info predictor, combined prosody info comprising a plurality of observations based on and aligned to the linguistic sequence, wherein the plurality of observations comprise linear combinations of statistical measures evaluating a plurality of prosodic components over a plurality of hierarchical time spans, wherein the observations are normalized;

modify the combined prosody info based on the prosody info offset, wherein the prosody info offset adjusts the target observation of the plurality of observations at the specified time span of the hierarchical time spans;

embed the modified combined prosody info into a latent space to generate embedded prosody info; and generating, via a trained neural network, an acoustic sequence based on the embedded prosody info concatenated with the linguistic embedding, wherein a prosodic characteristic of the generated acoustic sequence is adjusted based on the prosody info offset.

9. The computer-implemented method of claim 8, comprising:

combining by summation or concatenation and encoding the plurality of observations to generate the embedded prosody info, and concatenating the embedded prosody info with the embedded linguistic sequence.

10. The computer-implemented method of claim 8, comprising modifying the plurality of observations based on the prosody info offset.

11. The computer-implemented method of claim 10, wherein modifying the plurality of observations comprises adding the prosody info offset to corresponding observations.

12. The computer-implemented method of claim 8, wherein the plurality of observations are evaluated at an utterance level.

13. The computer-implemented method of claim 8, wherein the plurality of observations are evaluated locally and hierarchically at different temporal spans.

14. The computer-implemented method of claim 8, comprising generating an audio based on the acoustic sequence.

15. A computer program product for automatically controlling prosody, the computer program product comprising a computer-readable storage medium having program code embodied therewith, wherein the computer readable storage medium is not a transitory signal per se, the program code executable by a processor to cause the processor to:

receive a linguistic sequence and a prosody info offset comprising an adjustment for a target observation at a target time span;

encode, via a linguistic encoder, the linguistic sequence to generate an embedded linguistic sequence comprising a vector representation of a phoneme in a phonetic context;

generate combined prosody info comprising a plurality of observations based on the linguistic sequence, wherein the plurality of observations comprise linear combinations of statistical measures evaluating a plurality of prosodic components over a plurality of hierarchical time spans, wherein the observations are normalized;

modify the combined prosody info based on the prosody info offset, wherein the prosody info offset adjusts the target observation of the plurality of observations at the specified time span of the hierarchical time spans;

embed the modified combined prosody info into a latent space to generate embedded prosody info; and generate an acoustic sequence based on the embedded prosody info concatenated with the linguistic embedding, and the linguistic sequence, wherein a prosodic characteristic of the generated acoustic sequence is adjusted based on the prosody info offset.

16. The computer program product of claim 15, further comprising program code executable by the processor to align, combine and embed the plurality of observations to generate the embedded prosody info, and concatenate the embedded prosody info with the embedded linguistic sequence.

17. The computer program product of claim 15, further comprising program code executable by the processor to modify the plurality of observations based on the prosody info offset.

18. The computer program product of claim 15, further comprising program code executable by the processor to add the prosody info offset to corresponding observations of the prosody info.

19. The computer program product of claim 15, further comprising program code executable by the processor to train the prosody info predictor based on observed prosody info automatically extracted from unlabeled training data via an observed prosody info generator.

20. The computer program product of claim 15, further comprising program code executable by the processor to generate an audio based on the acoustic sequence.

\* \* \* \* \*